US011455360B2

(12) United States Patent
Garg et al.

(10) Patent No.: US 11,455,360 B2
(45) Date of Patent: *Sep. 27, 2022

(54) INLINE EDITING FIELD FOR NESTED WEBSITE SETTINGS

(71) Applicant: PAYPAL, INC., San Jose, CA (US)

(72) Inventors: Shreyas Garg, Fremont, CA (US); Nanda Kishore Kollaje Rao, San Jose, CA (US); Sheikh Ashraful Abedin, San Francisco, CA (US); Taikun Guo, Jersey City, NJ (US)

(73) Assignee: PAYPAL, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/235,541

(22) Filed: Apr. 20, 2021

(65) Prior Publication Data
US 2021/0279296 A1  Sep. 9, 2021

Related U.S. Application Data

(63) Continuation of application No. 16/680,454, filed on Nov. 11, 2019, now Pat. No. 10,984,181, which is a (Continued)

(51) Int. Cl.
G06F 16/9535 (2019.01)
G06F 3/0482 (2013.01)
(Continued)

(52) U.S. Cl.
CPC ........ *G06F 16/9535* (2019.01); *G06F 3/0482* (2013.01); *G06F 9/547* (2013.01); *G06F 16/2228* (2019.01); *G06F 16/2379* (2019.01); *G06F 16/248* (2019.01); *G06F 16/955* (2019.01); *G06F 16/958* (2019.01); *G06F 40/14* (2020.01); *G06F 40/166* (2020.01); *G06N 3/08* (2013.01)

(58) Field of Classification Search
CPC .................................................... G06F 16/248
See application file for complete search history.

(56) References Cited

U.S. PATENT DOCUMENTS

2006/0242553 A1  10/2006  Kulas
2007/0276810 A1  11/2007  Rosen
(Continued)

FOREIGN PATENT DOCUMENTS

WO   WO 0163484      8/2001
WO   WO 2016098991   6/2016

*Primary Examiner* — Asher D Kells
(74) *Attorney, Agent, or Firm* — Haynes and Boone, LLP

(57) ABSTRACT

There are provided systems and methods for an inline editing field for nested website settings. A computing device may be used to process a search query with a search engine and receive results. The search query may include a search for a particular website setting, such as a user profile, account, security, or preference setting that may allow a user to provide input and affect particular user or website data with the website. Determination of the requested website may be performed through a machine learning engine. The machine learning engine may identify the security setting nested in the website through multiple navigations, website flows, and navigations, and may extract processes and flows for use of the setting. An inline editing field may then allow for user input in a search interface that allows for editing the setting without navigation to the website and nested setting.

20 Claims, 6 Drawing Sheets

Related U.S. Application Data continuation of application No. 16/022,580, filed on Jun. 28, 2018, now Pat. No. 10,474,741.

(51) Int. Cl.
| | |
|---|---|
| *G06F 9/54* | (2006.01) |
| *G06F 16/248* | (2019.01) |
| *G06F 16/955* | (2019.01) |
| *G06F 16/958* | (2019.01) |
| *G06F 16/22* | (2019.01) |
| *G06F 16/23* | (2019.01) |
| *G06F 40/166* | (2020.01) |
| *G06F 40/14* | (2020.01) |
| *G06N 3/08* | (2006.01) |

(56) References Cited

U.S. PATENT DOCUMENTS

| | | |
|---|---|---|
| 2012/0143904 A1 | 6/2012 | Ainslie et al. |
| 2016/0155176 A1 | 6/2016 | Isaacson et al. |
| 2016/0275139 A1 | 9/2016 | Gandhe et al. |
| 2017/0046406 A1 | 2/2017 | Ganesan |
| 2017/0193065 A1 | 7/2017 | Cohen et al. |

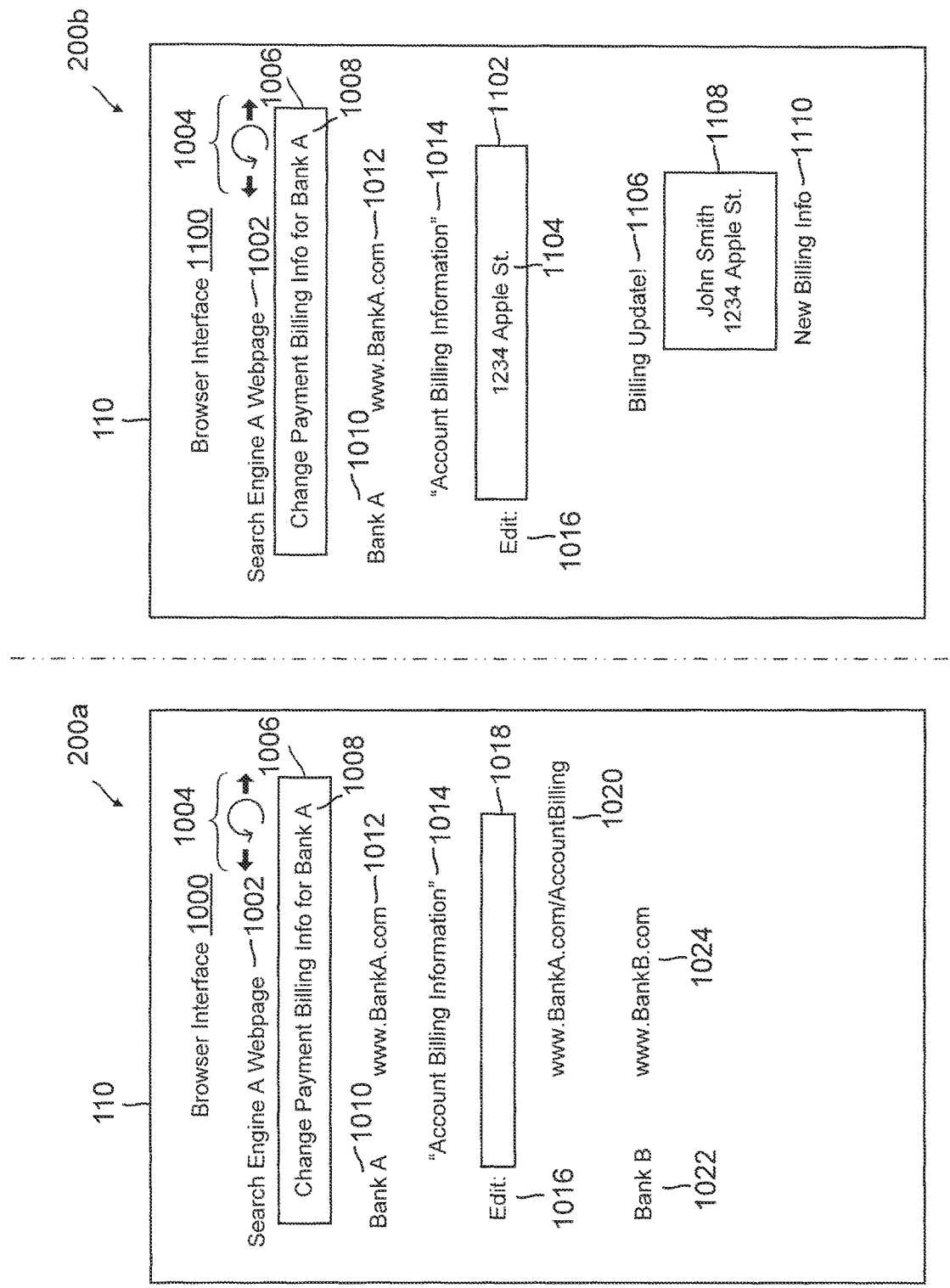

INLINE EDITING FIELD FOR NESTED WEBSITE SETTINGS

This application is a continuation of U.S. patent application Ser. No. 16/680,454, filed Nov. 11, 2019, which is a continuation of Ser. No. 16/022,580, filed Jun. 28, 2018, which is incorporated by reference herein their entirety.

TECHNICAL FIELD

The present application generally relates to a machine learning engine and neural network to identify nested website settings requested in a search query and an inline editing field that allows for editing the website setting without navigating to the website.

BACKGROUND

Users may utilize a search engine to search and locate particular websites that the user may wish to access. A user may wish to access and utilize the website to establish and/or edit particular data with the website, such as a setting for the user or website. The setting may allow for selection and entry of input that adjusts or configures the setting. For example, a user may provide a search query that identifies a website setting so that the user may access the website and navigate to the setting. However, once search results are received, the user may be required to identify the particular result that provides the proper setting that the user requests. Further, the user may be required to navigate to the website, and once at the website, navigate through multiple webpages and/or flows in order to reach the exact setting that the user requires.

BRIEF DESCRIPTION OF THE DRAWINGS

FIG. 2A is an exemplary user interface of a device displaying an inline editing field for a nested website setting with search results, according to an embodiment;

FIG. 2B is an exemplary user interface of an inline editing field having input for processing with a nest website setting, according to an embodiment;

Figure 1:
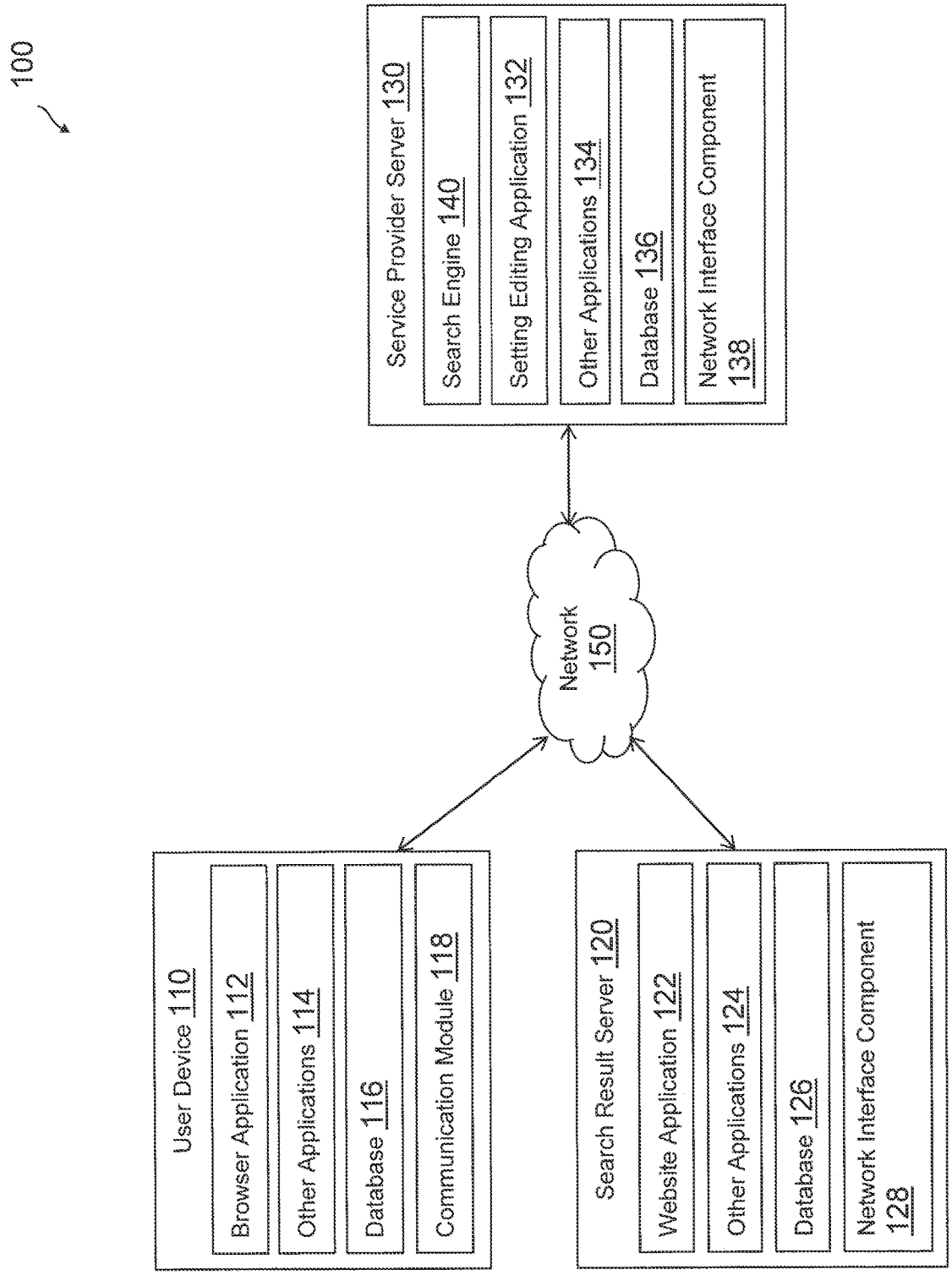
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for an inline editing field for nested website settings. Systems suitable for practicing methods of the present disclosure are also provided.

A user may utilize a computing device, such as a personal/tablet computer or mobile smart phone, to access an online search engine and submit a search query. The search query may include text (and image/video) language that identifies a particular online location for an entity (e.g., a merchant, service provider, etc.) that provides a website. The search request may further identify a website setting on the entity's website, which may be used to set, configure, and edit particular settings, preferences, or data for the user or an account of the user, as well as with the website for use by the user when the user accesses the website through a device. A website setting may correspond to any configurable setting, permission, or preference established with a website and specific to a user or device. This may include settings establishing particular user data used during processing and/or interacting with a service provider for a website, as well as settings that affect output of the website and/or use of the website by the user/device. For example, a website setting may correspond user account settings that store user information, such as shipping addresses, payment information, notifications, etc. A website setting may also allow the user to customize how content is displayed or delivered on a website. The search engine may execute a search process using the search query and may return search results, which may include the website and one or more links or browser navigations to the setting within the website. The search results including the setting may be nested within one or more website flows that require navigations and/or inputs to access the correct setting requested by the user.

A service provider, including either the search engine or a service provider that provides an application or executable process integrated with the search engine, may provide processing of the search query and search results to determine and provide an inline contextual editing field that allows for editing the setting directly from an interface displaying the search results, such as a webpage of the search engine having the search results for the search query. The service provider may utilize a machine learning engine that first performs natural language processing with the search query to determine identifiers and other search information for the requested website setting. The service provider may then execute the search for the website setting and analyze the search results through a neural network trained using the user's historical search information, website navigations, and website setting usage to determine the requested setting within the search results, such as the nested website setting for a website link within the search results. The service provider may then use a component loader to determine the domain flow to access the website setting and load components to access and provide input to the website setting through the domain flow, for example, using an editing process through the domain flow on the website. The component loader may provide an inline editing field within an interface that displays the search results, where the inline editing field allows for direct input without navigation to the website or through the domain flow. The component loader may utilize the inline editing field to receive input that is then processed with the website using the domain flow and the editing process for the website setting.

For example, an application may allow a user to request and receive data from a search engine and/or process available with an online service provider, such as a search engine provider or a service provider that provides a search option and process for a website or other online resource. The application may correspond to a browser application or dedicated device application that may be used to access one or more of the above described platforms, where the application may be used to receive, browse, view, and transmit data. However, other dedicated applications of service provider platforms that utilize a search process may also incorporate the processes described herein to provide inline editing fields after executing a search of a website or online platform and resources for the service provider. The application or website may be associated with the service provider, such as PayPal® or other online payment provider service, which may provide payments and the other aforementioned transaction processing services on behalf of users, merchants, and other entities.

In order to provide the inline processing tool to perform the processes described herein, a user may be required to establish an account with a service provider and/or generate a user profile that may be used to track historical user searches, website activity, and navigations on the service provider's website and/or with other websites. These search queries, website activity, and navigations may correspond to searching, locating, and using a website setting or preference input and editing option, such as one or more menu interfaces that accept input and allow users to select website, account, or user settings and preferences for the website's service. The user may be required to provide identification information to establish the account, such as personal information for a user, business or merchant information for such an entity, or other types of identification information including a name, address, and/or other information. The user may also be required to provide financial information, including payment card (e.g., credit/debit card) information, bank account information, gift card information, and/or benefits/incentives, which may be used to provide payment. In order to create an account, the user may be required to select an account name and/or provide authentication credentials, such as a password, personal identification number (PIN), answers to security questions, and/or other authentication information. In other embodiments, the user profile may be generated by the service provider using a browsing history of the user, which may be received from the browser application on the user's device and/or tracked by the service provider during online browsing sessions.

Once an account or user profile is created, the service provider may utilize the data when executing search queries submitted by the user for online data, including data for the service provider's website or online platform and/or data from other online resources. The service provider may receive a search query through the user's device using the browser application or dedicated application that accesses the service provider's search engine or search process on the online platform (e.g., using an application interface field, plug-in, or toolbar application). In order to perform query submission, the user may enter text data, such as a text query submission for a requested website and website setting (e.g., "How do I change my account settings?"). The user may also select text data of interest to the user, for example, by highlighting the text data of interest. The request may be selected through one or more menu options, such as a drop-down menu available during a right-click of highlighted text data, where the drop-down menu includes an option for the request. The query may also or instead include image or video data, or other types of multimedia data such as animation.

The service provider may then receive the input for the search query and may process the text input using natural language processing to determine keywords and actions within the search query. For example, the text input may be processed to determine the query's keywords through eliminating action words and isolating the keywords of the query. The service provider's search query processing may also fix misspellings by checking for typos and performing spell correction of the typos, which may use a user history. The query processing may also utilize the user's account or history to identify similar queries and results that were utilized by the user. The service provider may utilize the action (e.g., "how," "what," "why," etc., and other action words) to identify what the user is seeking in particular, such as the particular action to take with the keywords and thus the action the user would like to perform using the website's settings. The machine learning engine may therefore utilize a process to split the query into keywords and actions before submission to a search engine in order to find the action that the user would like to edit or update with the particular setting for the keywords.

The service provider may recognize characters, words, and/or content of the text input based on the characters of the text input. The service provider may also identify a tag or identifier in the text input. The service provider may provide natural language processing services and processes to identify the particular terms. A process of the service provider may segment the portions of the query from the rest of the data and process the characters, words, and/or phrases of the segmented portions. Such processing may be used to identify words, characters, and other data for the search query by the service provider. The language processing process may include machine learning based on past correct and/or incorrect search query submissions and corresponding results so that keyword and/or character identification may be refined.

After processing of the search query, the service provider may then use a search process to execute a search using the keywords and actions of the search query. The search process may correspond to an internal or external search engine which may utilize the processed search query to identify one or more webpages' or resources' online addresses to the corresponding setting requested by the user. For example, if the user is searching for a bank account and bank account setting updating, the service provider's query processing and submission may utilize a threshold, maximum matches, and character matching to identify a website for the bank account and a particular webpage and domain flow for the website setting process to update the bank account's settings. The threshold may correspond to how far from the query the search results are allowed to be, while the characters matching may include all or a portion of the matching terms/characters. Additionally, the actions words may be used to determine if the user is requesting, through the search query, to view the steps of the website setting process (e.g., the steps to edit the user's bank account settings) or if the user wants to directly access and change something for the website setting (e.g., change a name, address, or phone number for the bank account's information and settings).

The service provider's search process may then receive search results from the query, and may determine an item available with the merchant's platform using the search results. The search process may determine website locals (e.g., webpages and/or website data) and the language at the locals within the website to match to the keywords and the actions. For example, the search process may run through a search index built using user data, user history, first party tracking infrastructure (FPTI) data, and top searched settings. The search index may then be processed using the query with ranking systems for the particular settings. Additionally, the ranking system may be customized based on particular user or system needs.

The search results may identify one or more navigation links, webpages or online resource data, and/or website setting data (e.g., domain flow to the website setting, setting information, and/or setting input/edit process). The search results may be ranked in order of relevancy or percentage match. The search result may also include a link to the online website/platform, which may correspond to a webpage link or link to data available for the user's device. Additionally, the search result may be fed to a dropdown list or menu of the search interface field of the user's device. The dropdown list may allow the user to select the results. The search results may therefore include an online address or other locator for the search result data, as well as domain flows to access the settings and settings' processes. The search results may further include process data and flow on the website or online resource used to input data to edit and/or update the setting.

After selection of a particular result from the search results, a component loader for the application on the user's device may run so that an inline editing field may be provided for the setting of the selected search result. The component loader may load the setting requested by the user in the search result using the settings domain flow and editing process with the website or online resource. For example, the processes required to input data to edit or update settings may be loaded by the component loader and may be presented in an application interface. The inline editing field may correspond to an interface menu, option, or input field that accepts input from the user in the interface displaying the search results. The inline editing field may allow for editing without navigation to the support setting on the website or with the online resource, thereby not requiring the user to navigate through multiple interfaces for a domain flow required to edit the setting. After the user provides input to the inline editing field, the inline editing field may utilize the component loader to provide the input to the setting and effect the update or edit to the setting.

In this manner, a service provider may simplify its online platform to provide a faster and more fluid user experience by reducing the number of navigation events, time, and computing resources required to navigate a domain flow for a setting that may be used to edit and update data. The service provider may also provide increased search query processing to identify more precisely website settings that a user would like to edit. This reduces the time and effort required to identify the setting. Moreover, the inline editing tool may provide more streamlined and easier to utilize editing settings, thereby reducing computing time required by the user or of the computing device.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a user device 110, a search result server 120, and a service provider server 130 in communication over a network 150. A user (not shown) may utilize user device 110 to access the various features available for user device 110, which may include processes and/or applications service provider server 130 to perform searches for nested website settings and inline editing of the settings through a field provided with search results. Service provider server 130 may be used to perform search query processing and retrieve search result server 120 as a search result. Service provider server 130 may then utilize a process to provide an inline editing field on user device 110 that allows the user to edit a setting on search result server 120 without navigation to search result server 120.

User device 110, search result server 120, and service provider server 130 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 150.

User device 110 may be implemented as a communication device that may utilize appropriate hardware and software configured for wired and/or wireless communication with search result server 120 and/or service provider server 130. For example, in one embodiment, user device 110 may be implemented as a personal computer (PC), telephonic device, a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

User device 110 of FIG. 1 contains a browser application 112, other applications 114, a database 116, and a communication module 118. Browser application 112 and other applications 114 may correspond to executable processes, procedures, and/or applications with associated hardware. In other embodiments, user device 110 may include additional or different modules having specialized hardware and/or software as required.

Browser application 112 may correspond to one or more processes to execute software modules and associated devices of user device 110 to send and/or receive data over the Internet, including accessing website and online resources. In this regard, browser application 112 may correspond to specialized hardware and/or software utilized by a user of user device 110 to request processing a search query and view search results, which may utilize search result server 120 and/or service provider server 130. Browser application 112 may include one or more interfaces to view website data and/or access other online data. In various embodiments, browser application 112 may correspond to a general browser application configured to retrieve, present, and communicate information over the Internet (e.g., utilize resources on the World Wide Web) or a private network. For example, browser application 112 may provide a web browser, which may send and receive information over network 150, including retrieving website information (e.g., a website for service provider server 130), presenting the website information to the user, and/or communicating information to the website. However, in other embodiments, browser application 112 may include a dedicated application of service provider server 130 or other entity, which may be configured to access online resources and data and present the data through one or more specialized application interfaces.

Browser application 112 may include a process to provide a search query to service provider server 130 for processing, as discussed herein. Browser application 112 may receive search results to the query, which may be presented through an interface having selectable icons or links to search results and/or a drop down menu allowing selection of one of the search results. Selection of an interface may further populate an inline editing field using a component loader for the selected search result that loads the domain flow and editing process for a particular setting selected with the search results. The inline editing field may accept user input, which may be transmitted to service provider server 130 for processing to edit or update the setting associated with the selected search result and the inline editing field. Although browser application 112 is described herein as processing a search query, receiving search results, and editing a setting through an inline editing field using service provider server 130 for data processing and delivery, it is understood that one or more of processes of service provider server 130, such as those provided by search engine 140 and/or setting editing application 132, may be performed by browser application 112 without service provider server 130.

In various embodiments, user device 110 includes other applications 114 as may be desired in particular embodiments to provide features to user device 110. For example, other applications 114 may include security applications for implementing client-side security features, programmatic client applications for interfacing with appropriate application programming interfaces (APIs) over network 150, or other types of applications. Other applications 114 may also include email, texting, voice and IM applications that allow a user to send and receive emails, calls, texts, and other notifications through network 150. Other applications 114 may include device interface applications and other display modules that may receive input from the user and/or output information to the user. For example, other applications 114 may contain software programs, executable by a processor, including a graphical user interface (GUI) configured to provide an interface to the user. Other applications 114 may therefore use devices of user device 110, such as display devices capable of displaying information to users and other output devices, including speakers. In various embodiments, a transaction processing application of other applications 114 may be utilized to create an account used with service provider server 130.

User device 110 may further include database 116 stored in a transitory and/or non-transitory memory of user device 110, which may store various applications and data and be utilized during execution of various modules of user device 110. Database 116 may include, for example, identifiers such as operating system registry entries, cookies associated with browser application 112 and/or other applications 114, identifiers associated with hardware of user device 110, or other appropriate identifiers, such as identifiers used for payment/user/device authentication or identification, which may be communicated as identifying user device 110 to service provider server 130. Database 116 may include data generated during use of browser application 112 and execution of one or more processes, including browser data and browsing/search histories that may be transmitted to service provider server 130 for use in determining a nested setting on a website or other online resource for a search query. Moreover, received search results and tools for a component loader used for an inline editing field may be stored in database 116.

User device 110 includes at least one communication module 118 adapted to communicate with search result server 120 and/or service provider server 130. In various embodiments, communication module 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 118 may communicate directly with nearby devices using short range communications, such as Bluetooth Low Energy, LTE Direct, WiFi, radio frequency, infrared, Bluetooth, and near field communications.

Search result server 120 may be implemented as a device or server that may utilize appropriate hardware and software configured for wired and/or wireless communication with user device 110 and/or service provider server 130. For example, in one embodiment, search result server 120 may be implemented as a personal computer (PC), telephonic device, a smart phone, laptop/tablet computer, one or more servers, an online platform such as a merchant marketplace, and/or a cloud computing architecture providing online data that may be located with a search query. Although only one device is shown, a plurality of devices may function similarly. Although search result server 120 is shown as being an external resource that is located as search results by service provider server 130, in other embodiments search result server 120 may correspond to a server and/or data incorporated with service provider server 130 and located on the same or shared platform with service provider server 130.

Search result server 120 of FIG. 1 contains a website application 122, other applications 124, a database 126, and a network interface component 128. Website application 122 and other applications 124 may correspond to executable processes, procedures, and/or applications with associated hardware. In other embodiments, search result server 120 may include additional or different modules having specialized hardware and/or software as required.

Website application 122 may correspond to one or more processes that execute modules and associated specialized hardware of search result server 120 to provide online data to users that is accessible through a website or dedicated application on a device, including settings with search result server 120 that may be located through a domain address, navigated through a domain flow, and edited using an input process with website application 122. In this regard, website application 122 may correspond to specialized hardware and/or software of search result server 120 to provide online data through one or more interfaces that are accessible by user device 110 to allow a user to view and navigate website application and locate certain information, including website settings. In certain embodiments, website application 122 may be implemented as one or more applications providing an online platform that includes accessible item data for items for sale through website application 122. Thus, the data provided by website application 122 may be utilized to generate output data in browser application 112. In this regard, service provider server 130 may utilize search processes and search queries to locate the setting with website application 122 and provide search results for the setting to browser application 112. Website application 122 may further provide data for particular website settings, such as navigation data to the website setting. The navigation data may correspond to website locals or locations for the website settings, as well as language used at the locals that may allow for identification of the website setting by a search process when processing a search query. Website data for the settings may further be used to edit the website setting. The domain flow and input process for the website settings may be used by a component loader to load those components within an interface on user device 110 without navigation to the website setting and use of the flow/process. The flow/process may also be used by the component loader to edit the setting based on received user input, which may be performed by user device 110 and/or service provider server 130 through website application 122.

In various embodiments, search result server 120 includes other applications 124 as may be desired in particular embodiments to provide features to search result server 120. For example, other applications 124 may include security applications for implementing server-side security features, programmatic client applications for interfacing with appropriate application programming interfaces (APIs) over network 150, or other types of applications. Other applications 124 may include interface output applications and other display modules that may output one or more interfaces to user device 110. For example, other applications 124 may contain software programs, executable by a processor, including a graphical user interface (GUI) configured to provide an interface to user device 110.

Search result server 120 may further include database 126 stored in a transitory and/or non-transitory memory of search result server 120, which may store various applications and data and be utilized during execution of various modules of search result server 120. Database 126 may include, for example, identifiers such as operating system registry entries, cookies associated with website application 122 and/or other applications 124, identifiers associated with hardware of search result server 120, or other appropriate identifiers, such as identifiers used for payment/user/device authentication or identification. In various embodiments, database 126 may include website information and/or other data available over network 150.

Search result server 120 includes at least one network interface component 128 adapted to communicate with user device 110 and/or service provider server 130. In various embodiments, network interface component 128 may include a DSL (e.g., Digital Subscriber Line) modem, a PSTN (Public Switched Telephone Network) modem, an Ethernet device, a broadband device, a satellite device and/or various other types of wired and/or wireless network communication devices.

Service provider server 130 may be maintained, for example, by an online service provider, which may provide transaction processing services on behalf of users and/or merchants including generation and/or processing of digital shopping carts. In this regard, service provider server 130 includes one or more processing applications which may be configured to interact with user device 110, search result server 120, and/or another device/server to facilitate transaction processing. In one example, service provider server 130 may be provided by PAYPAL®, Inc. of San Jose, Calif., USA. However, in other embodiments, service provider server 130 may be maintained by or include another type of service provider, which may provide connection services to a plurality of users.

Service provider server 130 of FIG. 1 includes a search engine 140, a setting editing application 132, other applications 134, a database 136, and a network interface component 138. Search engine 140, setting editing application 132, and other applications 134 may correspond to executable processes, procedures, and/or applications with associated hardware. In other embodiments, service provider server 130 may include additional or different modules having specialized hardware and/or software as required.

Search engine 140 may correspond to one or more processes to execute software modules and associated specialized hardware of service provider server 130 to receive keywords and action terms of a search query and execute a search to identify one or more settings with a search result, such as search result server 140. In this regard, search engine 140 may correspond to specialized hardware and/or software to receive a receive a search query from user input and processed by setting editing application 132, where the search query used with search engine 140 may previously be processed to identify the keywords and actions of the search query. Search engine 140 may then execute a search, where the keywords and actions for the search query are processed using a search process. Search engine 140 may receive search results in response to executing the search using the search query, for example, by identifying websites having settings at website locals that may be edited using an editing process. The settings may further be located based on the language at the website locals, as the settings may be navigated through a domain flow. The search results may include data for an online resource, such as a website. The data may include navigation data, as well as website data such as website locals having settings and language used at the setting that may be displayed within an interface having the search results. Search engine 140 may generate the output data using the data and one or more processes, protocols, or interfaces of browser application 112 to format the output data for browser application 112. The output data may therefore be displayed in browser application 112, and may include an interface element, pop-up window, data in an interface field, and/or selectable option within the interface to display the data. The output data may also include an inline editing field generated by setting editing application 132.

Setting editing application 132 may correspond to one or more processes to execute software modules and associated specialized hardware of service provider server 130 to provide inline editing fields to search results from search engine 140 based on a search query and a nested setting, where the inline editing fields allow for editing of the nested setting without navigation to the setting and through the settings flow. In this regard, setting editing application 132 may correspond to specialized hardware and/or software to process a search query to determine keywords and action terms in the search query, for example, using natural language processing. Once the particular terms and words of the query are determined, the query may be processed using search engine 140 to receive search results. In various embodiments, setting editing application 132 may be used to construct search indexes using historical search data for users, and utilize the search indexes with a processed search query (e.g., the keywords and action terms) to identify a setting through search engine 140.

After receiving the search results, setting editing application 132 may determine the setting and setting data for each of the search results, such as the nested setting on the website or online resource that is nested within one or more navigations through a domain flow on a website. Setting editing application 132 may determine the domain flow that causes navigation to and through the setting, which may correspond to online address(es) for the setting and other navigation process data on the website. Setting editing application 132 may also determine the particular input or editing process for the setting on the website or with the other online resource, which may correspond to a process to provide input to update or adjust the setting. Based on the domain flow and the input process, setting editing application 132 may generate an inline editing field displayable with the search results, where the inline editing field accepts user input directly. Setting editing application 132 may receive user input and may process the user input with the setting through the domain flow and/or input process.

In various embodiments, service provider server 130 includes other applications 134 as may be desired in particular embodiments to provide features to service provider server 130. For example, other applications 134 may include security applications for implementing server-side security features, programmatic client applications for interfacing with appropriate application programming interfaces (APIs) over network 150, or other types of applications. Other applications 134 may contain software programs, executable by a processor, including a graphical user interface (GUI), configured to provide an interface to the user when accessing service provider server 130, where the user or other users may interact with the GUI to more easily view and communicate information. In various embodiments, other applications 134 may include connection and/or communication applications, which may be utilized to communicate information to over network 150.

Additionally, service provider server 130 includes database 136. As previously discussed, the user and/or the merchant may establish one or more digital wallets and/or accounts with service provider server 130. Digital wallets and/or accounts in database 136 may include user information, such as name, address, birthdate, payment instruments/funding sources, additional user financial information, user preferences, and/or other desired user data. Users may link to their respective digital wallets and/or payment accounts through an account, user, merchant, and/or device identifier. Thus, when an identifier is transmitted to service provider server 130, e.g., from user device 110, one or more digital wallets and/or payment accounts belonging to the users may be found. Database 136 may also store received search queries and processed data from search queries using with search engine 140. Search results and inline editing fields for search results may also be stored in database 136.

In various embodiments, service provider server 130 includes at least one network interface component 138 adapted to communicate with user device 110 and/or search result server 120 over network 150. In various embodiments, network interface component 138 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 150 may be implemented as a single network or a combination of multiple networks. For example, in various embodiments, network 150 may include the Internet or one or more intranets, landline networks, wireless networks, and/or other appropriate types of networks. Thus, network 150 may correspond to small scale communication networks, such as a private or local area network, or a larger scale network, such as a wide area network or the Internet, accessible by the various components of system 100.

FIG. 2A is an exemplary user interface of a device displaying an inline editing field for a nested website setting with search results, according to an embodiment. Environment 200a includes a browser interface 1000 output by a communication device, such as user device 110 having the described features, processes, and components discussed in reference to system 100 of FIG. 1. In this regard, a user viewing browser interface 1000 in environment 200a may view displayed data from processes executed by one or more of the applications discussed in reference to user device 110, such as browser application 112 in system 100.

Browser interface 1000 displays selectable search results including an inline editing field for a website setting that provides an input and editing process that is nested within a domain flow on the website. Search engine A webpage 1002 may display those search results in browser interface 1000, including a Bank A result 1010 and a Bank B result 1022. Browser interface 1000 further provides navigation tools 1004 that may be used to navigate webpages provided in search results in browser interface 1000. The search results may be in response to a search query 1008 in search field 1006, where search query 1008 includes a statement of "change payment billing info for Bank A." Search query 1008 may be used to identify keywords, such as "payment billing info" and "bank A" with action terms, such as "change." This may be used to locate bank A 1010 in the search results. Bank A 1010 may be located in a search index using the keywords and the action terms in search query 1008, for example, if the user and/or user profile associated with user device 110 has been used to generate a search index that includes Bank A 1010.

Browser interface 1000 displays Bank A 1010 with navigation address 1012 to Bank A 1010's website where the user may navigate to and edit payment billing information, such as "account billing information" input process 1014 that allows a user to edit account billing information through a website flow and input process 1014. However, instead of navigating to Bank A 1010's website using navigation address 1012, an inline editing field 1018 may be used with an edit process 1016 that allows a user to directly input data to browser interface 1000 for processing with input process 1014 on Bank A 1010's website. For example, webpage 1020 may correspond to the flow and input process 1014 that allows the user to utilize a domain flow through input process 1014 to enter input. However, inline editing field 1018 may directly take the input in browser interface 1000 and process the input for input process 1014, as shown in environment 200b of FIG. 2B. Browser interface 1000 may also include other selectable search results that may be ranked in order of relevance, such as bank B 1022 that may having payment billing information used by the user viewing browser interface 1000 (e.g., in a search index) and may be provided with a navigation address 1024.

FIG. 2B is an exemplary user interface of an inline editing field having input for processing with a nested website setting, according to an embodiment. Environment 200b includes a browser interface 1100 output by a communication device, such as user device 110 having the described features, processes, and components discussed in reference to system 100 of FIG. 1. In this regard, a user viewing browser interface 1100 in environment 200b may view displayed data from processes executed by one or more of the applications discussed in reference to user device 110, such as browser application 112 in system 100.

Browser interface 1100 displays selectable search results including an inline editing field for a website setting after receiving input from a user and processing the input with the website setting. Search engine A webpage 1002 corresponds to the same search engine from environment 200a of FIG. 2A, and similarly displays navigation tools 1004, search query 1008 and search field 1006, Bank A 1010, navigation address 1012, and input process 1014 on Bank A 1010's website that may be edited using the provided edit process 1016 for an inline editing process and field. In environment 200b, an inline editing field 1102 accepts user input 1104, which may then be processed with the website local for input process 1014 to enter user input 1104 to input process 1014. For example, the domain flow for input process 1014 may be utilized with the website fields and input accepting mechanisms to process user input 1104 with input process 1014 on Bank A 1010's website. In response to entering user input 1104 to input process 1014 and receiving updates to the account billing information, an update 1106 may be displayed, where update 1106 displays the updated setting 1108 for the new billing information 1110.

Figure 3A:
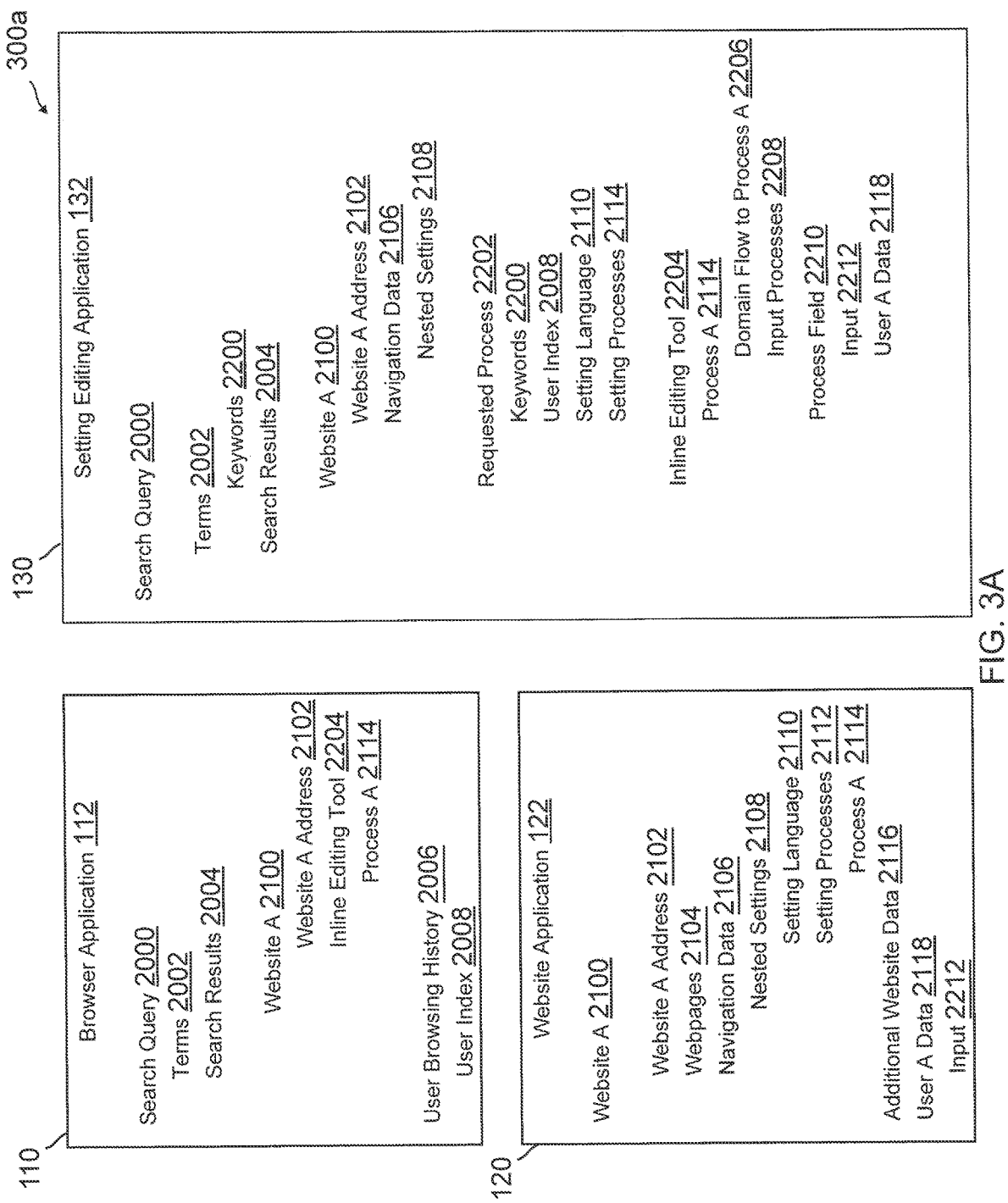
FIG. 3A is an exemplary system environment where a communication device and a service provider may interact to provide an inline editing field for a website setting with a website setting for a search result server, according to an embodiment.

FIG. 3A is an exemplary system environment where a communication device and a service provider may interact to provide an inline editing field for a website setting with a website setting for a search result server, according to an embodiment. Environment 300a of FIG. 3 includes user device 110, a search result server 120, and service provider server 130 discussed in reference to system 100 of FIG. 1.

In environment 300a, user device 110 executes browser application 112 corresponding generally to the processes and features discussed in reference to system 100 of FIG. 1. In this regard, user device 110 may utilize browser application 112 to perform a search for a website setting or other online resource data editing process, which may correspond to a search query 2000 submitted by a user. Search query 2000 may include terms 2002, which may be processed with a search index and other information and processes (e.g., natural language processing) to determine search results 2004 by service provider server 130. Search results 2004 may include website A 2100 for search result server 120. Search results 2004 for website A 2100 may be displayed or output with a website A address 2102 and an inline editing tool 2204 for a process A 2114. Additionally, browser application 112 may include a user browsing history 2006 and a user index 2008 that may be used to determine search results 2004.

Search result server 120 of environment 300a includes data that may be used to locate search results 2004. For example, website application 122 corresponds generally to the processes and features discussed in reference to system 100 of FIG. 1. Website application 122 may provide data for website A 2100 over a network, which includes website A address 2102 and webpages 2104 of website A 2100. Navigation data 2106 may be used to locate and navigate nested settings 2108 on website A 21000, where each of nested settings 2108 may include setting language 2110 and setting processes 2112, such as process A 2114 provided in search results 2004. Website A 2100 may be associated with additional website data 2116, including user accounts that may be edited using nested settings 2108. Thus, additional website data 2116 may include user A data 2118 that may be edited using input 2212 from service provider server 130.

In environment 300a, service provider server 130 executes setting editing application 132 corresponding generally to the processes and features discussed in reference to system 100 of FIG. 1. In this regard, service provider server 130 may edit process A 2114 in search results 2004 using an inline editing field without requiring that user device 110 navigate directly to process A 2114 on website A 2100. Setting editing application 132 may process search query 2000 prior to executing a search to identify terms 2002 and keywords 2200 in terms 2002. After processing and executing the search for search query 2000, search results 2004 may be received by setting editing application 132 and processed to provide an inline editing tool. For example, search results 2004 include website A 2100 having website A address 2102 and navigation data 2106 for nested settings 2108. Within search results 2004, setting editing application 132 may determine a requested process 2202 based on keywords 2200 and user index 2008 through processing setting language 2110 and setting processes 2114 for nested settings 2108. In response to identifying requested process 2202, setting editing application 132 may generate an inline editing tool 2204 for process A 2114. Inline editing tool 2204 may be generated using domain flow to process A 2206 and input processes 2208 for process A 2114. Inline editing tool 2204 includes a process field 2210 to accept input 2212 and edit user A data 2118, which may be output to user device 110.

Figure 3B:
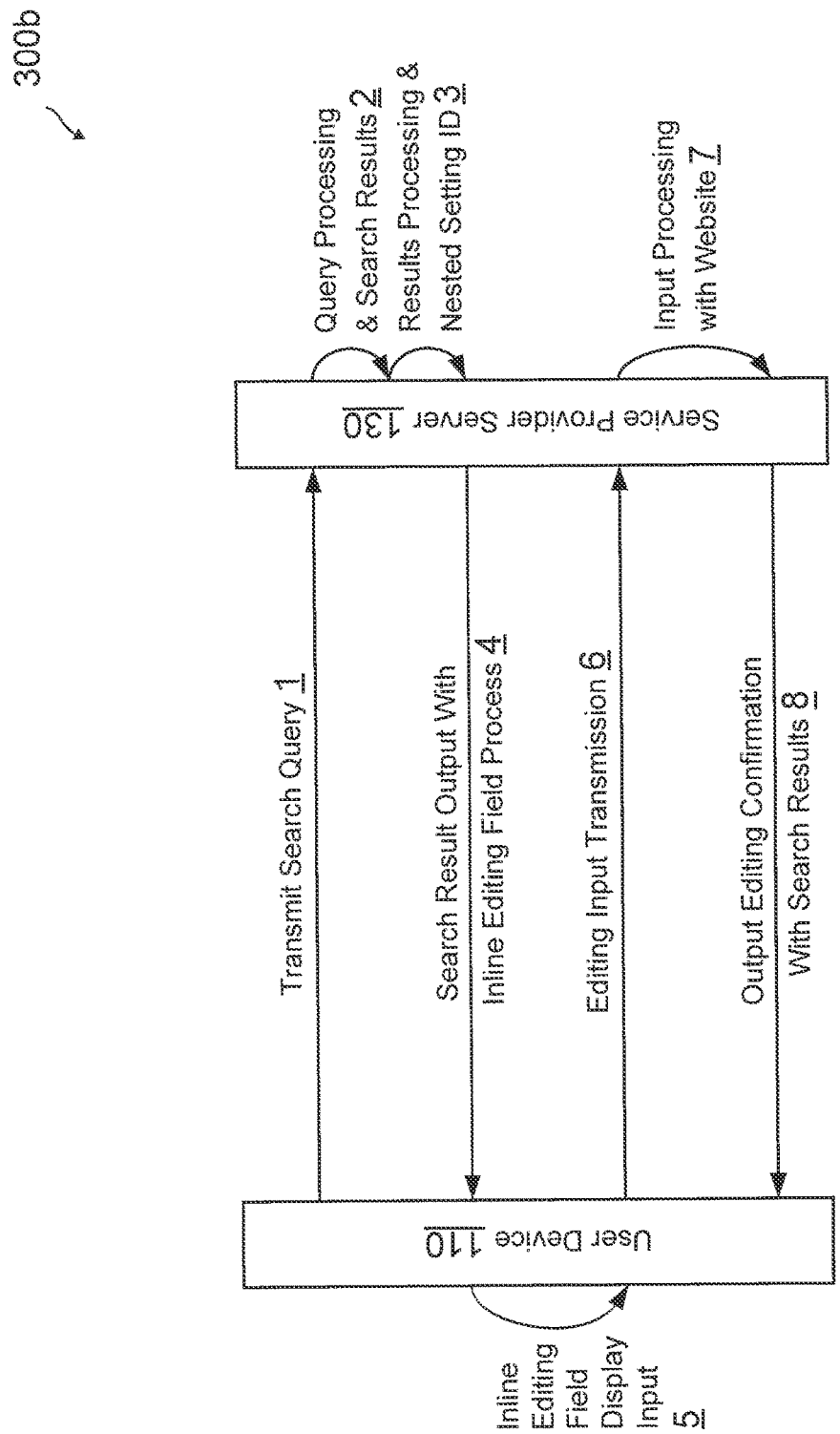
FIG. 3B is an exemplary communication exchange flowchart for use by a user device and a service provider used to determine a nested website setting requested by a user in a search query and provide an inline editing field in an application interface for the website setting, according to an embodiment.

FIG. 3B is an exemplary communication exchange flowchart for use by a user device and a service provider used to determine a nested website setting requested by a user in a search query and provide an inline editing field in an application interface for the website setting, according to an embodiment. Communication exchange flowchart 300b of FIG. 3B includes a user device 110 and a service provider server 130 discussed in reference to system 100 of FIG. 1.

User device 110 may initiate communication exchange flowchart 300b by transmitting a search query to service provider server 130 at step 1. The search query may include action terms and keywords used to indicate a website setting that a user wishes to edit. Thus, service provider server 130 may perform query processing using natural language processing to determine search results through search indexes and/or other historical information available to service provider server 130 at step 2. This may be performed using a search engine internal or external to service provider server 130. Once the search results are obtained, at step 3, service provider server 130 may then perform results processing using the search query to identify a nesting setting identification and generation of an inline editing field for the identified nested setting. These search results are then transmitted by service provider server 130 and output on user device 110 with the inline editing field process at step 4.

At step 5, user device 110 then displays the inline editing field, for example, based on selection of the search results and/or a corresponding website setting within the search results. A user may provide input after selection, which may be directly input to the inline editing field process without user device 110 navigating to the website for the website setting. At step 6, user device 110 uses the inline editing field process to transmit the input to service provider server 130 for processing with the search results, for example, using the input process for the website setting. Service provider server 130 may process the input with the website at step 7, which may include editing the website setting with the website and without requiring user device 110 to navigate to the website.

Thus, at step 8, service provider server 130 transmits a confirmation of the editing and outputs the confirmation with the search results so that the user may view the editing website setting.

Figure 4:
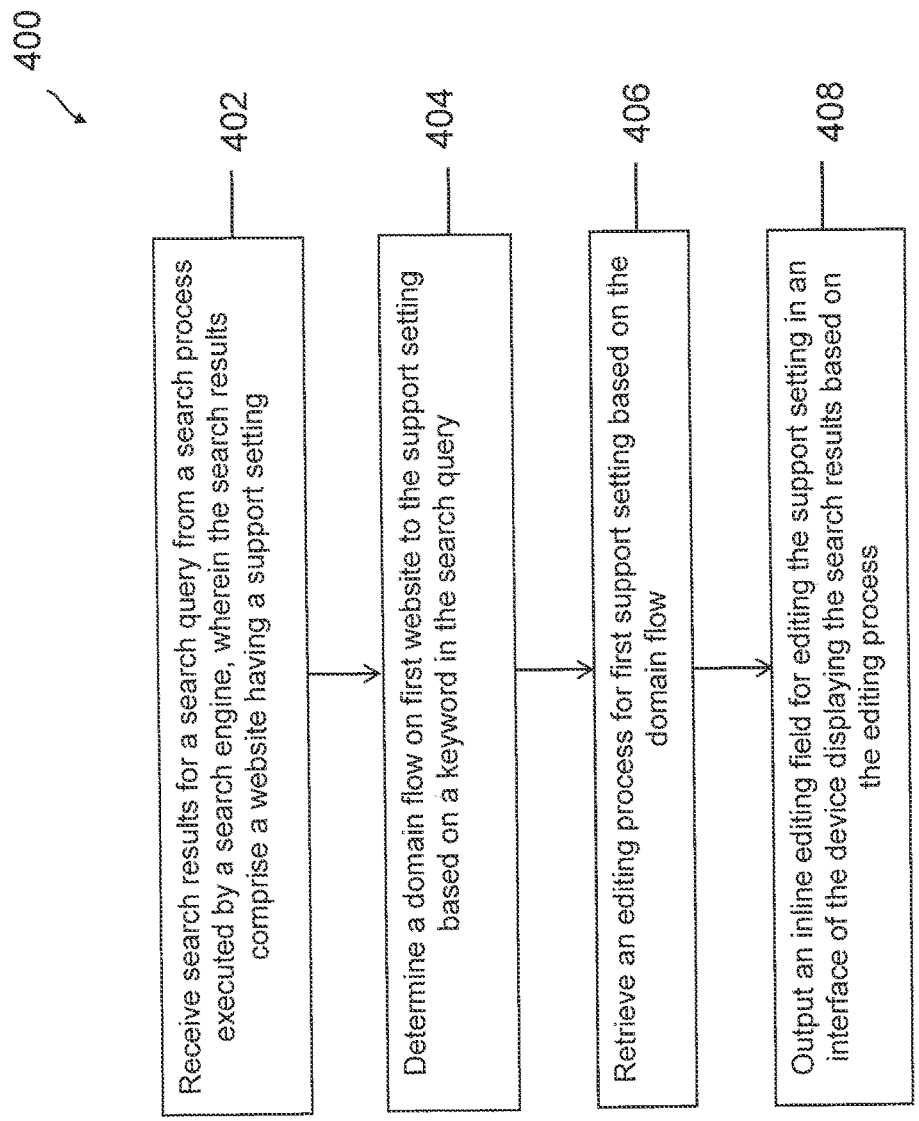
FIG. 4 is a flowchart of an exemplary process for an inline editing field for nested website settings, according to an embodiment.

FIG. 4 is a flowchart of an exemplary process for an inline editing field for nested website settings, according to an embodiment. Note that one or more steps, processes, and methods described herein of flowchart 400 may be omitted, performed in a different sequence, or combined as desired or appropriate.

At step 402 of flowchart 400, search results for a search query are received from a search process executed by a search engine, wherein the search results comprise a website having a support setting. In order to determine the search results, the search query may be processed to determine keywords and actions terms, which may be processed using an index generated based on at least one of a transaction history for the device, a browser history for a browser application on the device, or application use data for an application installed on the device. For example, the keywords and action terms may be identified using natural language processing and fixing any typographical errors and other issues in the search query. The index may be determined using past websites, and may include locals of input processes and settings accessed by a user on the past websites.

At step 404 of flowchart 400, a domain flow on first website to the support setting is determined based on a keyword in the search query. For example, the first domain flow may further be determined based on a user index for the user, wherein the user index is based on a browsing history with the first website by the user. This may include identifying webpage locals for a plurality of support settings on the first website, wherein the webpage locals are associated with website navigation events to the plurality of support settings. Additionally, this may further include determining website keywords for the plurality of support settings on the first website, matching the keyword and the user index to the website keywords, determining one of the website locals for the first support setting based on the matching the keyword and the user index to the website keywords, and determining the first domain flow for the one of the website locals. An editing process for first support setting is retrieved based on the domain flow, at step 406 of flowchart 400. This may correspond to a website flow to and through the setting, which may be nested within navigations, processes, and webpages of the website.

An inline editing field for editing the support setting in an interface of the device displaying the search results is output based on the editing process, at step 408 of flowchart 400. The inline editing field may also be provided with navigation data for the domain flow and/or for the setting. In various embodiments, input to the inline editing field may be received through the interface, and the first support setting is edited without re-directing the interface to the first support setting on the first website based on the input. Editing the first support setting may comprise submitting, by the system through the inline editing field, the input to the first editing process for the first support setting through a website application programming interface (API) of the first website. Additionally, a component loaded may be used for the inline editing field to load website components. The device may also be required to log in to the website to allow for editing of the first support setting. The inline editing field for a web browser may correspond to one of a text input field, a drop down menu, or a selection option associated with the first support setting, and may mirror the first editing process of the first website.

A change of at least a portion of the search query may be received, and one of a second website or a second support setting may be determined based on the change. This may cause determination of a second domain flow for the one of the second website or the second support setting and retrieval of a second editing process based on the second domain flow. The inline editing field may then be updated based on the second editing process. Input to this field may then be received and the second editing process may be used with the second website or second support setting. The user index may then be updated based on the change to the search query.

Figure 5:
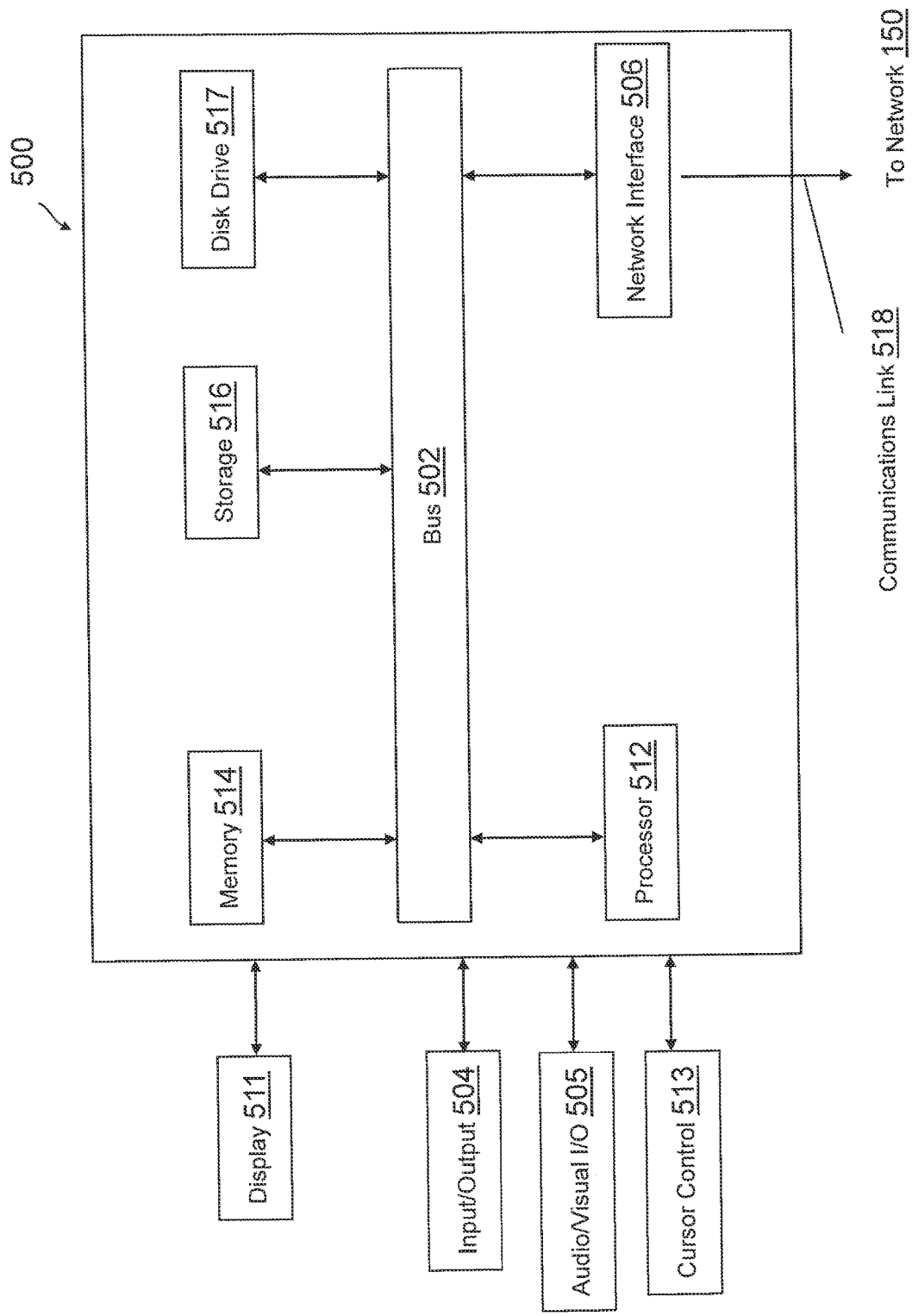
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 150. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
   a non-transitory memory; and
   one or more hardware processors couple to the non-transitory memory and configured to read instructions from the non-transitory memory to cause the system to perform operations comprising:
   determining, based on characters input into a query box, an account website having a set of nested settings associated with a user account;
   determining, based on characters input into the query box, a set of actions to be performed on the set of nested settings;
   determining a flow for performing the set of actions on the set of nested settings on the account website;
   retrieving, based on the determined flow, a set of editing processes for editing the set of nested settings; and
   causing to be displayed a set of inline editing fields for the user account on the account website based on the retrieved set of editing processes.

2. The system of claim 1, wherein the displayed set of inline editing fields enables the set of actions to be performed on the set of nested settings on the account website.

3. The system of claim 1, wherein the flow comprises a set of navigational events for accessing the set of nested settings on the account website.

4. The system of claim 1, wherein the set of inline editing fields corresponds to one or more of a text input field, a drop down menu, or a selection option.

5. The system of claim 1, wherein the operations further comprise:
   receiving a user input at one of the set of inline editing fields; and
   causing the user input to be entered into one of the set of nested settings on the account website.

6. The system of claim 5, wherein causing the user input to be entered into one of the set of nested settings on the account website comprises submitting the set of inline editing fields through a website application programming interface (API) of the account website.

7. The system of claim 1, wherein the flow is further determined based on a user index, the user index being based on a browsing history associated with the account website by a user account associated with the user index.

8. The system of claim 1, wherein the set of inline editing fields is displayed as one of a pop-up notification, a menu option, or an interface element.

9. A method comprising:
   determining, based on characters input into a query box, an account website having a set of nested settings associated with a user account;
   determining, based on characters input into the query box, a set of actions to be performed on the set of nested settings;
   determining a flow for performing the set of actions on the set of nested settings on the account website;
   retrieving, based on the determined flow, a set of editing processes for editing the set of nested settings; and
   causing to be displayed a set of inline editing fields for the user account on the account website based on the retrieved set of editing processes.

10. The method of claim 9, wherein the displayed set of inline editing fields enables the set of actions to be performed on the set of nested settings on the account website.

11. The method of claim 9, wherein the flow comprises a set of navigational events for accessing the set of nested settings on the account website.

12. The method of claim 9, wherein the set of inline editing fields corresponds to one or more of a text input field, a drop down menu, or a selection option.

13. The method of claim 9, further comprising:
receiving a user input at one of the set of inline editing fields; and
causing the user input to be entered into one of the set of nested settings on the account website.

14. The method of claim 13, wherein causing the user input to be entered into one of the set of nested settings on the account website comprises submitting the set of inline editing fields through a website API of the account website.

15. The method of claim 9, wherein the flow is further determined based on a user index, the user index being based on a browsing history associated with the account website by a user account associated with the user index.

16. The method of claim 9, wherein the set of inline editing fields is displayed as one of a pop-up notification, a menu option, or an interface element.

17. A non-transitory machine-readable medium having stored thereon machine-readable instructions executable to cause a machine to perform operations comprising:
determining, based on characters input into a query box, an account website having a set of nested settings associated with a user account;
determining, based on characters input into the query box, a set of actions to be performed on the set of nested settings;
determining a flow for performing the set of actions on the set of nested settings on the account website;
retrieving, based on the determined flow, a set of editing processes for editing the set of nested settings; and
causing to be displayed a set of inline editing fields for the user account on the account website based on the retrieved set of editing processes, wherein the displayed set of inline editing fields enables the set of actions to be performed on the set of nested settings on the account website.

18. The non-transitory machine-readable medium of claim 17, wherein the flow comprises a set of navigational events for accessing the set of nested settings on the account website.

19. The non-transitory machine-readable medium of claim 17, wherein the flow is further determined based on a user index, the user index being based on a browsing history associated with the account website by a user account associated with the user index.

20. The non-transitory machine-readable medium of claim 17, wherein the set of inline editing fields is displayed as one of a pop-up notification, a menu option, or an interface element.

* * * * *